J. J. VOORHEES, Jr.
PUMP VALVE AND THE LIKE.
APPLICATION FILED JAN. 14, 1914.

1,295,394.

Patented Feb. 25, 1919.

Witnesses:
Arthur Choquet
Edmund Quincy Mosia

Inventor
John J. Voorhees, Jr.,
By his Attorney
Clifford E. Dunn.

UNITED STATES PATENT OFFICE.

JOHN J. VOORHEES, JR., OF JERSEY CITY, NEW JERSEY.

PUMP-VALVE AND THE LIKE.

1,295,394.   Specification of Letters Patent.   Patented Feb. 25, 1919.

Application filed January 14, 1914. Serial No. 812,041.

*To all whom it may concern:*

Be it known that I, JOHN J. VOORHEES, Jr., a citizen of the United States, residing in Jersey City, county of Hudson, and State of New Jersey, have invented certain new and useful Improvements in Pump-Valves and the like, of which the following, taken in connection with the accompanying sheet of drawings, forms a full, clear, and concise description.

This invention relates to improvements in pump valves and the like made of rubber or similar material and comprises a novel and improved construction of reinforced valve. While rubber or rubber composition valves have long been used in pumps and have been recognized as being the most satisfactory for such use they have nevertheless been subject to certain serious disadvantages, among which may be mentioned the necessity for excessive thickness in valves of the larger sizes in order to secure the proper degree of rigidity. This extra thickness greatly increases the cost of the valves and also causes the valves to take up a large amount of space and so interfere with the easy inflow and outflow of the water being pumped. Such restriction of the water flow often results in substantial reduction in the efficiency of the pump and the pressure which can be obtained thereby. Certain forms of metal reinforced valves have also been proposed for use in pumps, but in most of these the rubber composition has been mechanically interlocked with the metal reinforcing member, involving a more or less expensive construction for the latter and not insuring a permanent union of the parts. Such valves have also been perfectly rigid so that conformation of the valve to its seat in case of any irregularity of the parts has been impossible. It is an object of the present invention to overcome these and other difficulties to which former valve constructions have been subject.

In the accompanying drawings which show certain preferred embodiments of my invention chosen to illustrate the principles thereof, but to the details of which my invention is not limited:

Figure 1:
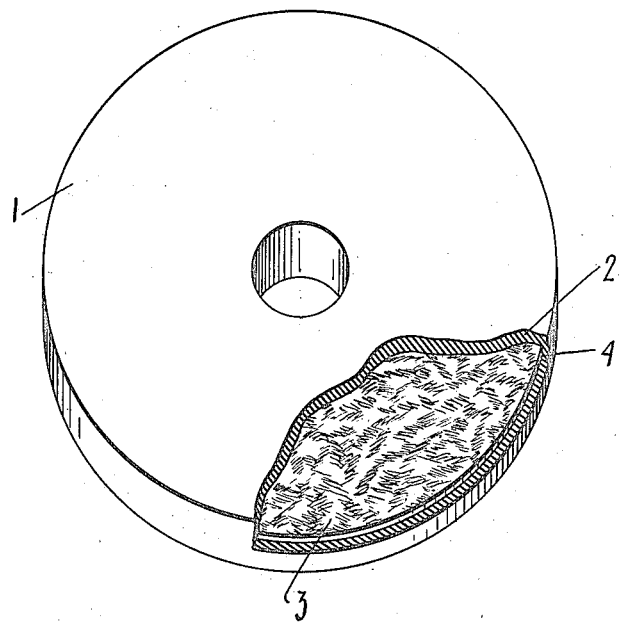
Figure 1 is a perspective view of a reversible valve, a part of the coating being broken away to show the reinforce.
Figure 2:
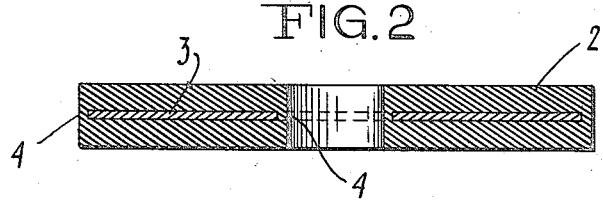
Fig. 2 is a transverse section of the valve shown in Fig. 1.

Referring to the drawings in detail and particularly to Figs. 1 and 2, 1 is a valve of the disk type, such as used in pumps, it being composed primarily of a body 2 of rubber or rubber compound or similar more or less elastic and plastic material. 3 is a metal plate about which this material is molded and to which it is firmly united in some suitable manner. Preferably the surface of the metal plate is left somewhat rough and is plated with substances causing the rubber compound to chemically unite with the metal upon vulcanization, as for example in the process described in United States Letters Patent No. 1,036,576. The reinforcing plate 3 is preferably centrally located in the mass of elastic material 2, so as to leave an equally thick layer of the latter upon each side, making the valve reversible. This permits the valve, when the elastic material becomes worn upon one side, to be turned over and so practically doubles the life of the valve. The elastic material preferably covers the inner and outer edges of the plate, as indicated at 4, thereby completely protecting the plate from rust or corrosion. Owing to the presence of the reinforcing plate a comparatively soft rubber compound may be used, if desired, thereby insuring a proper and tight closing of the valve, even if the valve seat is not perfectly true. Accurate grinding of the valve seat is thus not essential. The thickness of the valve may also be materially reduced, owing to the presence of the reinforcing plate, providing a larger unrestricted space for the inflow and outflow of the water in the chambers of the pump. This is an important consideration, particularly as applied to many existing pumps, as it is a fact that in a large number of the pumps now being placed upon the market the inflow and outflow chambers are of unduly restricted area. By applying my improved pump valves to such pumps the efficiency and capacity thereof are materially increased. By making the reinforce of proper material, usually more or less springy and flexible sheet metal, the exact degree of rigidity desired may be secured for the valve, ordinarily enough flexibility being permitted to enable the valve to seat properly under any and all conditions. The reinforce absolutely prevents breakage of the valve and also prevents it from being sucked through or into the valve space, as has been known to occur with unreinforced rubber valves.

By reason of the firm chemical union of the rubber with the reinforcing plate, it is possible for the valve to flex considerably without causing the rubber to separate from the plate. If the rubber and plate were not firmly united the continued flexing of the valve, such as will occur in the use of an article in which the reinforcing member is not rigid, would quickly separate the rubber from the metal and destroy the usefulness of the valve.

Figure 3:
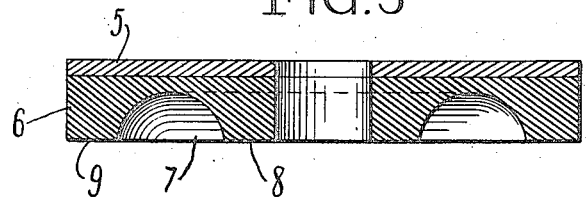
Fig. 3 is a view similar to Fig. 2 of a modified construction.

Fig. 3 shows a modified form of valve in which the reinforcing plate 5 has a facing of rubber or suitable composition 6 united to one side only. The composition facing is provided with an annular groove 7 so as to provide inner and outer seats 8 and 9, respectively, engaging the valve seat in a well understood manner. The face of the reinforcing plate 5 engaged by the compound may be left rough, as described in connection with the other modification and the rubber firmly united to the metal in a suitable manner, as by the process above indicated. Obviously other modifications may be made without departing from the spirit of my invention.

Having thus described my invention what I claim as new herein and desire to secure by Letters Patent is:

1. A pump valve or the like, comprising a plain slightly flexible metallic reinforcing plate having a slightly rough surface and having a metal alloy deposit thereon, and a body of comparatively soft rubber compound forming a seating element and firmly united to said plate by an amalgamation of constituents of the alloy deposit and the rubber compound brought about through the process of vulcanization.

2. A pump valve or the like, comprising a flexible metal plate having a layer of rubber compound vulcanized and chemically united to the surface thereof, whereby the flexing of the valve will not separate the rubber from the metal.

3. A thin disk pump valve of rubber composition having a central aperture and having a flat, slightly flexible metal reinforcing plate embedded therein, the surface of said plate being roughened by slight irregularities, said rubber compound and plate being chemically united.

In witness whereof I have hereunto set my hand in the presence of two subscribing witnesses this 9th day of January, 1914.

JOHN J. VOORHEES, Jr.

Witnesses:
EDMUND QUINCY MOSES,
WM. C. DUNN.